Patented May 15, 1945

2,375,774

UNITED STATES PATENT OFFICE 2,375,774

STABILIZATION OF ROTENONE PREPARATIONS

John Carl de Jonge, Grand Rapids, Mich.

No Drawing. Application July 20, 1940, Serial No. 346,548

8 Claims. (Cl. 167—24)

(Granted under the act of March 3, 1883, as amended April 30, 1928; 370 O. G. 757)

This application is made under the act approved March 3, 1883, as amended by the act of April 30, 1928, and the invention herein described, if patented, may be manufactured and use by or for governmental purposes without the payment to me of any royalty thereon.

This invention relates to new and useful compositions of matter produced by impregnating starch with rotenone or its related compounds such as deguelin, tephrosin, toxicarol, etc.; or extracts containing these compounds, and reacting the impregnated starch with alkali earth and heavy metal hydroxides, basic salts, carbonates or bicarbonates.

The object of this invention is to stabilize rotenone ($C_{23}H_{22}O_6$) and its related compounds against the destructive effects of air and sunlight when used in horticultural sprays and dusts.

Another object of this invention is to increase the contact toxicity of the stabilized product to insects that are economically injurious to man by combining with the rotenone an extract of pyrethrum as well as toxic metal salts.

Still another object of this invention is to add fungicidal properties to the stabilized products containing rotenone and its related compounds by means of suitable metallic salts, such as copper, zinc or a mixture of the two salts.

It has been shown by tests that air and sunlight cause oxidation of rotenone and its related compounds with the resulting loss in toxicity to insects. Other toxic compounds such as deguelin, tephrosin, toxicarol, etc., occurring in extracts of derris root, cube root, or other specie of Lonchcarpus are similarly affected. In the following table are shown to what extent some of the compounds are decomposed after being exposed to air and sunlight for ten days.

| | Percent |
|---|---|
| Rotenone | 64 |
| Dihydrorotenone | 32 |
| Derris root | 75 |
| Derris extract | 89 |

Derris deposits are decomposed both in the presence and in the absence of sunlight when exposed to air (see Soap, vol. 15, No. 5, May 1939, pages 103-105). The rate of decomposition increases with an increase in temperature as shown by sunlight exposure tests for fifteen days at 32.5° F. in which an average of 60% of the deposit is decomposed, while at 70-75° F. for the same period 73% of the deposit was decomposed. It also has been shown that deposits of cube on cabbage deteriorate on exposure to the weather but retain some toxicity after five days.

Toxicity tests to insects were made with my stabilized product prepared from an extract of derris root, starch, and a copper salt. The samples were exposed in thin layers in shallow paper trays to bright sunlight and air for a period of 110 hours at an average temperature of 80° F. Tests showed the exposed sample to be as toxic as the freshly prepared preparation containing the same amount of active toxic principles and the same copper content. The samples tested contained 0.8% rotenone and 8.3% copper.

I have found that starch can be impregnated with rotenone, its related compounds such as deguelin, tephrosin, toxicarol, etc., or with extracts containing these compounds hereinafter generically termed "rotenonical compounds," and the impregnated starch reacted with an alkaline earth or heavy metal hydroxide, basic salt, carbonate, or basic carbonate to produce a new composition of matter, stable to air and sunlight, and entirely suitable for use as a horticultural dust or spray. Rotenone and its related compounds act both as a stomach and contact poison. The contact activity may be enhanced by the addition of an extract of pyrethrum, which readily mixes with a solution of rotenone or extract containing it.

Fungicidal properties are imparted to the composition when suitable metallic salts are incorporated in the product. Starch preparations containing copper, zinc, or a mixture of the two salts possess greater fungicidal properties than most of the other possible metal salts. Extracts of derris, cube, barbaco, hairi, nekoe, timbo, or other roots belonging to the specie of Lonchcarpus, a genus of tropical plants belonging to the family Fabaceae, may be used in impregnating the starch. The metallic hydroxides, basic metal salts, metal carbonates or basic metal carbonates prevent oxidation of the active toxic principles as well as blocking or otherwise neutralizing the destructive effects of sunlight. The soluble alkali earth and heavy metal salts such as magnesium, calcium, barium; manganese; copper, zinc, tin, lead; etc., which are precipitated as the hydroxide, basic salt, carbonate, or basic carbonate when treated with sodium, potassium, or ammonium hydroxides, or soluble alkali carbonates and bicarbonates such as sodium carbonate or sodium bicarbonate may be employed. In the process of manufacturing the new product, hereinafter more fully described, reactions take place which produce from the water-soluble impregnated starch and water soluble metal salt a water insoluble product from which neither the starch nor the metal salt can be washed even by boiling, and in which the toxic principals are stabilized. The reaction product is thus quite different from any mere physical admixture of ingredients.

Tests have shown that the products prepared from copper and zinc salts are safe to apply to foliage either as a dust or as a spray without causing foliage injury. One of the objections to the use of powdered derris, cube or timbo roots is their lack of adherence to foliage as well as stability. By the utilization of starch in the new composition of matter both of these objections are overcome. Inert materials such as talc, starch, bentonite, etc., may be added to dilute the product if desired. The product may be prepared containing varying amounts of active toxic principles or extracts, depending upon the nature of the product desired and the use to which it is to be put. The amount of alkaline earth or heavy metal salts that may be chemically combined with the rotenonical impregnated starch preparation is not definitely known, but sufficient can be strongly combined in the product to stabilize the active toxic principles and to produce good fungicides. The new compositions of matter are capable of being ground to a very fine dust.

The starch granule is composed of an outer portion known as α-amylose and an inner component known as β-amylose. When starch is completely hydrolized glucose is produced which is known to combine with the hydroxides of metals. From this, as well as the insolubilizing of the product, it appears the metals are chemically combined with the starch. Starches contain a small amount of fatty matter which can be completely removed by extraction with a solvent such as menthanol or cellosolve. It has been found possible to prepare preparations that are impervious to and not readily wet by water. These preparations are made by adding two to three per cent or more of fatty acids such as stearic, oleic, or mixtures of fatty acids. If too large a percentage of acids are used, products are obtained that are liable to be gummy. Two types of products, therefore, may be obtained: one that is readily wet by water which contains none or only a very small amount of fatty matter and the other impervious to water and requiring a wetting agent to suspend it in water. The starch used in either case should be dried at 105° C. until thoroughly dry as some starches contain considerable amounts of water. The drying renders the starch granule more permeable to the absorption of the active toxic principles.

The preferred method of manufacturing my new composition of matter will now be fully described, it being understood that deviations in the procedure may be made without departing from the spirit of the invention. The extracted or unextracted starch is first dried at 105° C. until thoroughly dry. Rotenone or an extract of derris root, cube root, etc., is dissolved in a volatile solvent such as chloroform. If the pyrethrins are to be incorporated in the composition an extract of pyrethrum is dissolved in the solution of rotenone, etc. Fatty acids are also dissolved in the rotenone solution if preparations are to be made which are impervious to water.

Two or three per cent of fatty acids is generally sufficient, but more may be used if desired. Sufficient solvent should be used so that when the starch is stirred into the solution a well mixed and uniform product is obtained. After the solution of rotenone or extract has been well mixed with the starch the solvent is completely removed by evaporating under reduced pressure and preferably at a temperature below 100° C., if pyrethrum extract has been added to the rotenone solution, as heat affects the pyrethrins. The dry starch-rotenone product is now suspended in a solution of a salt or mixture of salts whose hydroxides, basic salts, carbonates, or basic carbonates are precipitated by dilute solutions of alkalies, carbonates, or bicarbonates such as sodium hydroxide, sodium carbonate, or sodium bicarbonate. Ammonium hydroxide may be used in cases where more complete precipitation of the metal salts takes place as in the case of lead salts. The dilute precipitating agents are added slowly with vigorous agitation, and the agitation continued for half an hour after the metal salt has been precipitated. The final reaction mixture should be practically neutral in reaction, as alkalies and acids gradually attack the toxic principles. The insolubilized and stabilized product is filtered, well washed and dried at a temperature not to exceed 100° C. but preferably considerably lower. The dried product is ground to a fine powder.

The following illustrations are given to show the operation of this invention, it being understood however that the proportions and ingredients may be changed, depending upon the nature of the product desired, without departing from the spirit of the invention.

*Example 1.*—To prepare 100 grams of an insecticide containing 4% rotenone and 10% calcium the following materials and weights are required:

| | Grams |
|---|---|
| Starch | 70 |
| Calcium chloride ($CaCl_2$) | 28 |
| Derris extract (containing 10% rotenone) with or without 3% fatty acids | 40 to 43 |
| Sodium bicarbonate ($NaHCO_3$) | 21 |

*Example 2.*—To prepare 100 grams of an insecticide containing 2% rotenone and 10% magnesium, the following materials and weights are required:

| | Grams |
|---|---|
| Starch | 70 |
| Magnesium sulphate ($MgSO_4.7H_2O$) | 101 |
| Cube extract (containing 10% rotenone) with or without 3% fatty acids | 20 to 23 |
| Sodium bicarbonate ($NaHCO_3$) | 43 |

*Example 3.*—To prepare 100 grams of an insecticide containing 1% rotenone and 10% barium, the following materials and weights are required:

| | Grams |
|---|---|
| Starch | 70 |
| Barium nitrate $Ba(NO_3)_2$ | 19 |
| Rotenone—one gram dissolved in chloroform containing none or 3% of fatty acids | -- |
| Sodium bicarbonate ($NaHCO_3$) | 12.5 |

*Example 4.*—To prepare 100 grams of an insecticide and fungicide containing 1% rotenone, 0.5% pyrethrins, and 10% copper, the following materials and weights are required:

| | Grams |
|---|---|
| Starch | 66 |
| Copper chloride ($CuCl_2.2H_2O$) | 26.8 |
| Derris extract (containing 10% rotenone) with or without 3% fatty acids | 10–13 |
| Pyrethrum extract (containing 10% pyrethrins) | 5 |
| Sodium carbonate ($Na_2CO_3$) | 16.6 |

*Example 5.*—To prepare 100 grams of an insecticide and fungicide containing 2% rotenone and 10% zinc, the following materials and weights are required:

| | Grams |
|---|---|
| Starch | 75 |
| Zinc chloride (ZnCl$_2$) | 21 |
| Cube extract (containing 10% rotenone) with or without 3% fatty acids | 20–23 |
| Sodium hydroxide (NaOH) | 12 |

*Example 6.*—To prepare 100 grams of an insecticide containing 1% rotenone and 10% lead, the following materials and weights are required:

| | Grams |
|---|---|
| Starch | 85 |
| Lead nitrate Pb(NO$_3$)$_2$ | 16 |
| Timbo extract (containing 10% rotenone) with or without 3% fatty acids | 10–13 |
| Ammonium hydroxide (NH$_4$OH) | 33 |

*Example 7.*—To prepare 100 grams of an insecticide and fungicide containing 2% rotenone, 5% copper, and 5% zinc, the following materials are required:

| | Grams |
|---|---|
| Starch | 70 |
| Copper chloride (CuCl$_2$.2H$_2$O) | 13.4 |
| Zinc chloride (ZnCl$_2$) | 10.5 |
| Sodium bicarbonate | 23.8 |
| Derris extract (containing 10% rotenone) with or without 3% fatty acids | 20 to 23 |

Having fully described my invention I claim:

1. The process of manufacturing a stabilized product of the class described, which consists essentially in impregnating starch with a solution of a rotenonical dissolved in a volatile solvent; removing the solvent by evaporation; suspending the resulting toxic-impregnated starch composition in a solution of at least one of the soluble salts of the group consisting of copper-, zinc-, tin-, lead-, manganese-, and alkali earth metal-salts, the metals of which are precipitated by a reagent from the group consisting of dilute alkalis, carbonates, and bicarbonates; gradually adding such reagent to the suspension-containing solution and agitating the same until substantially complete reaction has occurred, whereby the metals of the salts become insoluble constituents in the composition, the impregnated starch becomes insolubilized, and the rotenonical becomes stabilized; and separating the so stabilized insolubilized product.

2. A process according to claim 1 characterized in that 1 to 2% of fatty acids is dissolved with the rotenonical in the volatile solvent before the starch is impregnated with said solution.

3. A process of producing an insolubilized stabilized rotenonical-starch composition, which consists in forming a suspension of rotenonical-impregnated starch in an aqueous solution of at least one of the soluble salts of the group consisting of copper-, zinc-, tin-, lead-, manganese-, and alkali earth metal-salts, the metals of which are precipitated by a reagent from the group consisting of dilute alkalis, carbonates, and bicarbonates; gradually adding such reagent to the suspension-containing solution and agitating the same until substantially complete reaction has occurred, whereby the metals of the salts become insoluble constituents in the composition, the impregnated starch becomes insolubilized, and the rotenonical becomes stabilized; and separating the so stabilized insolubilized product.

4. A composition of the class described, consisting essentially of a rotenonical-starch-metal salt product in which the rotenonical is stabilized and the starch and metal salt insolubilized, said product being the product formed by the process of claim 3.

5. A process of producing an insolubilized stabilized rotenonical-starch-copper insecticide and fungicide, which consists in forming a suspension of rotenonical-impregnated starch in an aqueous solution of a soluble copper salt the metal of which is precipitated by a reagent from the group consisting of dilute alkalis, carbonates, and bicarbonates; gradually adding such reagent to the suspension-containing solution and agitating the same until substantially complete reaction has occurred, whereby the copper of the salt becomes an insoluble constituent of the composition, the impregnated starch becomes insolubilized, and the rotenonical becomes stabilized; and separating the so stabilized insolubilized product.

6. A rotenonical-starch-copper insecticide and fungicide in which the rotenonical is stabilized and the starch and copper insolubilized, said product being the product formed by the process of claim 5.

7. A process of producing an insolubilized stabilized rotenonical-starch-zinc insecticide and fungicide, which consists in forming a suspension of rotenonical-impregnated starch in an aqueous solution of a soluble zinc salt the metal of which is precipitated by a reagent from the group consisting of dilute alkalis, carbonates, and bicarbonates; gradually adding such reagent to the suspension-containing solution and agitating the same until substantially complete reaction has occurred, whereby the zinc of the salt becomes an insoluble constituent of the composition, the impregnated starch becomes insolubilized, and the rotenonical becomes stabilized; and separating the so stabilized insolubilized product.

8. A rotenonical-starch-zinc insecticide and fungicide in which the rotenonical is stabilized and the starch and zinc insolubilized, said product being the product formed by the process of claim 7.

J. CARL DE JONGE.